(12) United States Patent
Shriver

(10) Patent No.: US 6,336,586 B1
(45) Date of Patent: Jan. 8, 2002

(54) SYSTEMS FOR READING THE BALANCE OF AN ELECTRONIC MONEY CARD AND PROCESSES FOR MANUFACTURING THE SAME

(75) Inventor: Stefaan A. Shriver, Newton, MA (US)

(73) Assignee: LCI Technology Group (NL)

( * ) Notice: Subject to any disclaimer, the term of this patent is extended or adjusted under 35 U.S.C. 154(b) by 0 days.

(21) Appl. No.: 09/498,886

(22) Filed: Feb. 7, 2000

Related U.S. Application Data

(63) Continuation of application No. 08/411,449, filed on Sep. 6, 1996, now Pat. No. 6,065,674.

(51) Int. Cl.$^7$ .............................. G06K 19/06; G06K 5/00
(52) U.S. Cl. ............................................. 235/380; 235/492
(58) Field of Search .................... 235/380, 386, 235/382, 387, 492; 283/106, 107, 96; 902/4

(56) References Cited

U.S. PATENT DOCUMENTS

| 4,211,919 A | * | 7/1980 | Ugon ............................ 235/487 |
|---|---|---|---|
| 4,277,837 A | * | 7/1981 | Stuckert ........................ 235/380 |
| 4,423,317 A | | 12/1983 | Berezowski et al. |
| 4,724,527 A | * | 2/1988 | Nishimura ..................... 364/705 |
| 4,910,696 A | * | 3/1990 | Grossman et al. ...... 364/705.02 |
| 4,951,044 A | * | 8/1990 | Nelson et al. ........... 340/825.44 |
| 5,221,838 A | | 6/1993 | Gutman et al. |
| 5,326,964 A | * | 7/1994 | Risser ........................... 235/487 |
| 5,362,955 A | * | 11/1994 | Haghiri-Tehrani ........... 235/492 |
| 5,514,862 A | | 5/1996 | Salzano |

FOREIGN PATENT DOCUMENTS

| JP | 58-105381 | 6/1983 |
|---|---|---|
| JP | 61-138390 | 6/1986 |
| JP | 281291 | 3/1990 |
| WO | WO 98/10363 | 3/1998 |

\* cited by examiner

*Primary Examiner*—Thien M. Le
(74) *Attorney, Agent, or Firm*—Ropes & Gray

(57) ABSTRACT

Balance reader systems are disclosed that read the balance of an electronic money card and that are integrated into the sidewall of a wallet, as well as methods for making the same.

5 Claims, 2 Drawing Sheets

SYSTEMS FOR READING THE BALANCE OF AN ELECTRONIC MONEY CARD AND PROCESSES FOR MANUFACTURING THE SAME

This application is a continuation of application Ser. No. 08/411,449 filed on Sep. 6, 1996 now U.S. Pat. No. 6,065,679.

Field of the Invention

The invention relates to systems for reading the balance of an electronic money card and processes for manufacturing such systems and, in particular, to systems that include a balance reader integrated into a wallet and processes for manufacturing the same.

BACKGROUND OF THE INVENTION

Electronic money cards are now widely used for transacting business. Generally, these electronic money cards are credit card size electronic devices that have a data port that can be connected into an electronic money transaction machine that increases or decreases the balance stored on the money card, depending upon the transaction performed. For example, the electronic money card can be inserted into an electronic bank machine that can increase the balance stored on that card to represent thereby the withdrawal of funds from the bank. Conversely, the electronic money card can be inserted into an electronic cash register machine that can decrease the balance on the card responsive to a purchase of goods.

Electronic money cards work well for carrying and storing data signals representative of electronic money. However, unlike conventional hard currency, electronic money signals are not readily discernible by a user wishing to determine the amount of money available to that user. Accordingly, electronic money cards require a balance reader that allows the user to determine the balance stored on that card. Typically, these balance readers are electronic circuit card assemblies sized to receive a money card, with a port for slidably receiving the electronic money card and with a display that can display to a user the balance stored in that card. Although these balance readers generally work well, they tend to be bulky, and complicated plastic cases that are cumbersome to carry.

Accordingly, it is an object of the invention to provide balance readers that are more facile to use and more convenient to carry.

Other objects of the invention shall be made obvious by the review of the attached figures and upon study of the associated detailed description.

SUMMARY OF THE INVENTION

The invention provides a balance reader for reading an electronic money card. The balance reader according to the invention is integrated into a sidewall of a wallet to provide a balance reader that is easy to carry and facile to use.

In one aspect, the invention is understood as an apparatus for reading the balance of an electronic money card. Such apparatus includes a wallet having a first sidewall, and a card sleeve coupled to the sidewall and having a first partition that houses a balance reader which includes a contact for electrically communicating with a terminal point of the electronic money card, a second partition disposed adjacent to the first partition and dimensioned for slidably receiving an electronic memory card, and a contact port coupling the first partition to the second partition and disposed between the partitions to allow the contact to electrically couple with the terminal point.

In one embodiment, the card sleeve is formed of a non-conductive material, such as plastic, vinyl, rubber, or any other non-conductive material.

The balance readers of the invention can include a printed circuit board assembly, wherein the balance reader comprises an electrical circuit card assembly disposed upon a printed circuit board. The printed circuit board can be a flexible circuit board of the type that can be bent and folded. Alternatively, the balance reader can include an electronic assembly that is formed on the first sidewall of the wallet. In this embodiment, the sidewall of the wallet can be leather, canvas, plastic, or any other material suitable for forming wallets.

In a further embodiment, systems according to the invention include a telecommunications element for exchanging data signals across a telephone communication line. The telecommunication system can include an acoustic coupler, or can further include an electronic connection element for connecting to a telephone communication system and for transmitting electrical data signals across a telephone network. The electronic connection element can be, in one embodiment, a conventional telephone plug for connecting with a telephone jack.

In a further aspect, the invention can be understood as processes for manufacturing a balance reader for an electronic money card. Processes according to the invention comprise the steps of providing a wallet having a first sidewall, and applying to that sidewall a conductive material to form a circuit pattern for the balance reader. Optionally, processes of the invention can include the further step of mounting circuit elements to the sidewall to form a circuit assembly thereon. In this aspect, the step of applying a conductive material to the sidewall can include the step of providing a mask over the sidewall, as well as applying a conductive paste to the sidewall, or further applying a conductive ink to the sidewall.

BRIEF DESCRIPTION OF THE ILLUSTRATED EMBODIMENTS

DESCRIPTION OF THE ILLUSTRATED EMBODIMENTS

Figure 1:
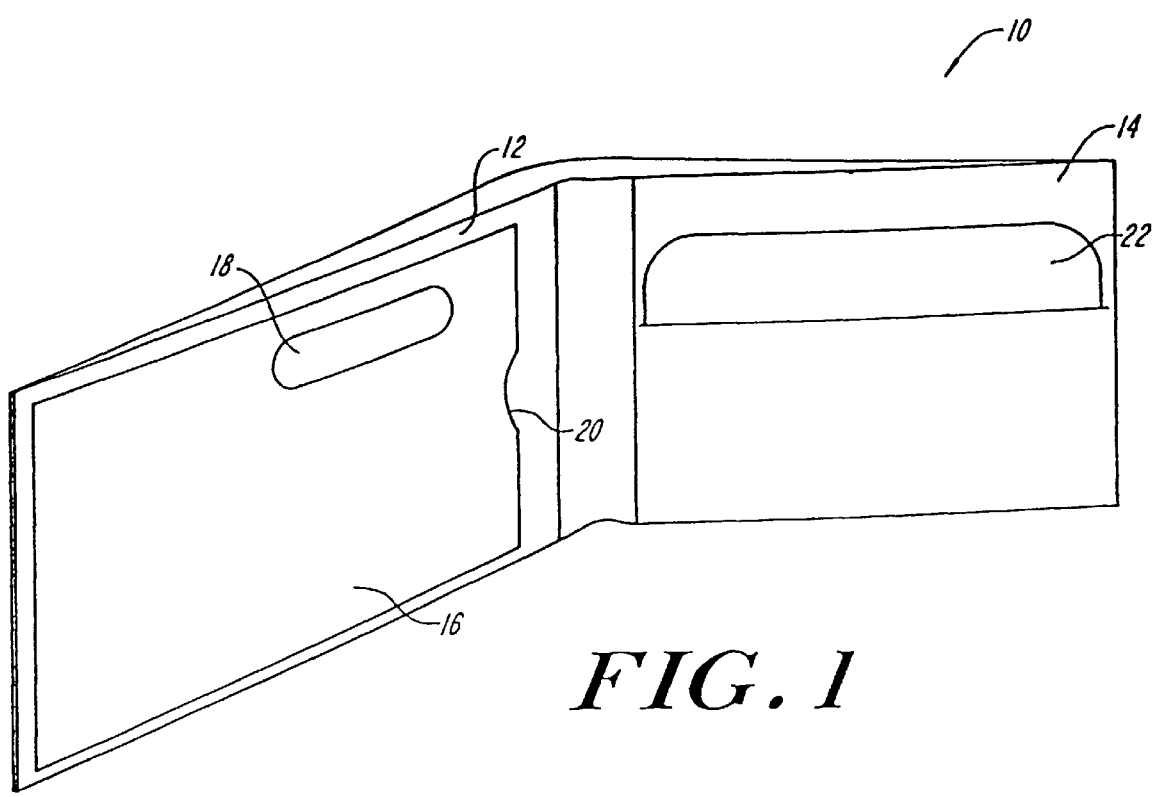
FIG. 1 depicts a wallet according to the present invention that has a balance reader integrated into the sidewall of the wallet.

FIG. 1 depicts one embodiment of the invention that can be a wallet 10 having a first sidewall 12, a second sidewall 14, a balance reader 16 with a display 18, and a receiving port 20.

As depicted by FIG. 1, the balance reader 16 is integrated into the sidewall 12 of the wallet 10. The bank card 22 depicted in FIG. 1 can be slid into the receiving port 20 to be read by the balance reader 16. The balance on the card 22 will be depicted in display 18 to alert the user as to the balance remaining on the card 22.

Figure 2:
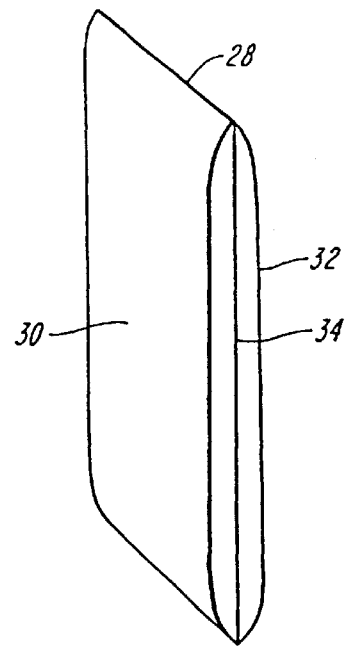
FIG. 2 illustrates a sleeve suitable for use with the wallet depicted in FIG. 1.

FIG. 2 depicts a card sleeve 28 that includes a first sidewall 30, a second sidewall 32, and an interior partition wall 34. As depicted in FIG. 2, the first sidewall 30 and the partition wall 34 form a first partition and, similarly, the second sidewall 32 and the partition wall 34 form a second partition within the card sleeve 28. The depicted card sleeve 28 can be a conventional plastic credit card sleeve suitable for holding a first and second credit card within the respective first and second partition formed by the sidewalls 30 and 32 and the partition wall 34.

The card sleeve 28 can be integrated into the wallet 10 by attaching the exterior face of one of the sidewalls 30 or 32 to the sidewall 12 of the wallet 10 depicted in FIG. 1. For example, the card sleeve 28 depicted in FIG. 2 can be mechanically attached to the sidewall 12 and the depicted wallet 10 in FIG. 1 by gluing the exterior of the sidewall 32 against the sidewall 12. Alternatively, the card sleeve 28 can be stitched against a wallet sidewall 12 to attach the sleeve 28 into the wallet 10. As will be seen from the following, the card sleeve 28 forms a housing that can house a balance reader for reading the balance of an electronic money card and that can provide a partition which can slidably receive an electronic money card to be read by the balance reader incorporated into the card sleeve 28. In this way, the invention provides a thin, compact, and easy to use balance reader that is incorporated into a wallet.

Figure 3:
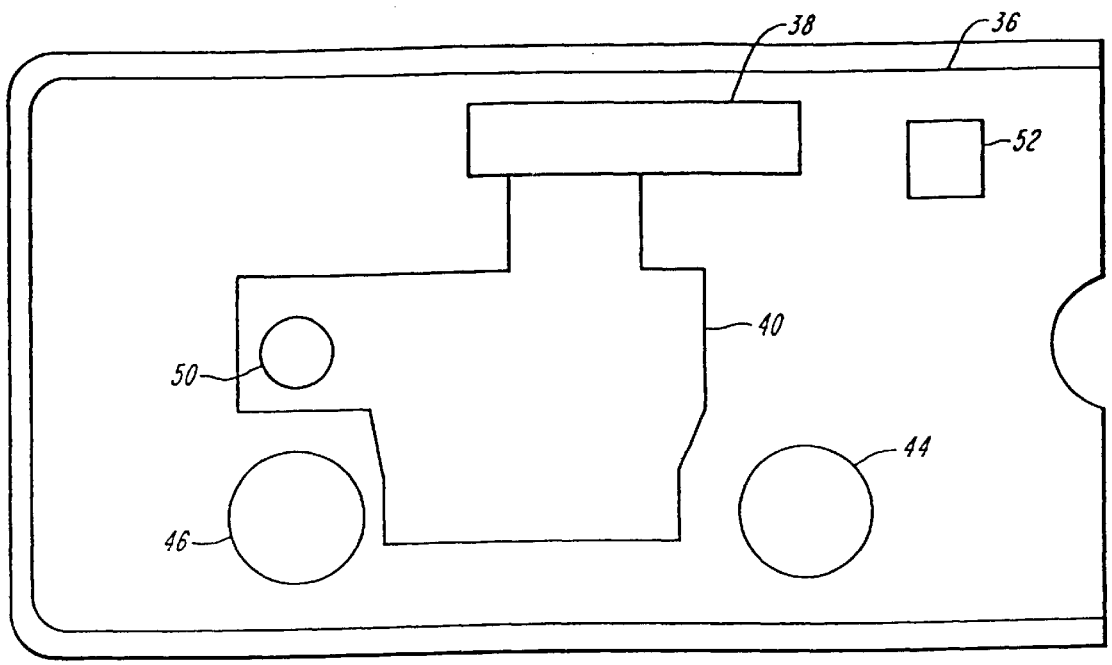
FIG. 3 depicts a balance reader incorporated into one partition of the sleeve depicted in FIG. 2.

FIG. 3 depicts an electronic assembly that forms a balance reader suitable for reading the balance of an electronic money card. As illustrated, FIG. 3 provides a cut-away view of electronic circuit assembly 36 housed within the card sleeve 28, in that the exterior wall, either 30 or 32 of card sleeve 28, is not depicted to show in detail the electronic circuit assembly 36 of the balance reader housed within the card sleeve 28. The depicted electronic circuit assembly 36 includes a display element 38, an electronic circuit 40, a first battery 44, a second battery 46, a switch element 50, and a telecommunications interface 52.

The circuit assembly 36 can be fitted within one of the partitions formed within the card sleeve 28. In one example, the circuit assembly 36 is fitted within the first partition of card sleeve 28 formed between the sidewall 30 and the inner partition wall 34. In this embodiment, the circuit assembly 36 is fixably attached to the partition wall 34 to prevent the circuit assembly 36 from moving. The balance reader depicted in FIG. 3 can be a conventional balance reader of the type of manufactured and sold by Oki Electronics Corporation of Tokyo, Japan. In this embodiment, the electronic circuit assembly reader operates responsive to activation of the dome switch 50 depicted in FIG. 3 that makes contact with the battery 44 and 46 and causes the circuit 40 of the balance reader 36 to power up. By application of pressure against the circuit card 36, contact points on the opposite side of the board 36 (not shown) can be pushed against the leads of a purse card placed adjacent to the circuit card 36. Upon forming an electrical connection between the contact points of the circuit assembly 36 and the leads of the money card 22, the electronic 40 perform a read operation that reads the balance of the purse card 22. The balance is then displayed by the display element 38.

It will be apparent to one of ordinary skill in the art of electrical engineering that any circuit assembly 36 suitable for being fixed within the card sleeve 28 can be practiced with the present invention, and subtractions and modifications to the circuit assembly 36 described herein did not depart from the scope of the invention. In particular, alternative embodiments of the circuit assembly 36 can be provided that employ an amphenol contacting switch element which incorporates the contacting switch in a single device. The amphenol device can be used instead of the dome switch 50 depicted in FIG. 3 for activating the circuit 40 to read the balance of the purse card 22. Further embodiments of the circuit assembly 36 can be practiced with the invention without departing from the scope thereof.

In the embodiment depicted in FIG. 3, the circuit card 36 includes a telecommunication element 52. The telecommunication element 52 can allow the circuit assembly 36 to couple to a telecommunication system to transmit data across the public switching telephone network (PSTN). In one embodiment, the assembly 36 includes a modem chip and a miniature loud speaker and microphone to form an acoustic coupler. In this embodiment, the microphone element can be incorporated in one of the sidewalls of the wallet 10 depicted in FIG. 1 and the loudspeaker element can be depicted in the opposite sidewall of the wallet 10. The loudspeaker and the microphone elements can be separated by a distance of approximately 165 millimeters or other distance suitable for providing an acoustic coupler that can be placed against the handset of a telephone couple the loudspeaker to the mouthpiece of the telephone handset and to couple the microphone to the ear piece of the handset to transmit data across the PSTN.

In an alternative embodiment, a telecommunication element 52 provides a telephone jack to allow a telephone cord to connect to the circuit card 36. In this embodiment, a telephone jack can be directly coupled to the electronics of the card 36 and the modem chip can negotiate the transfer of data between the card 36 and a remote site. Other embodiments for allowing the balance reader to transmit data across the public switching telephone network can practice with the present invention without departing from the scope thereof.

Figure 4:
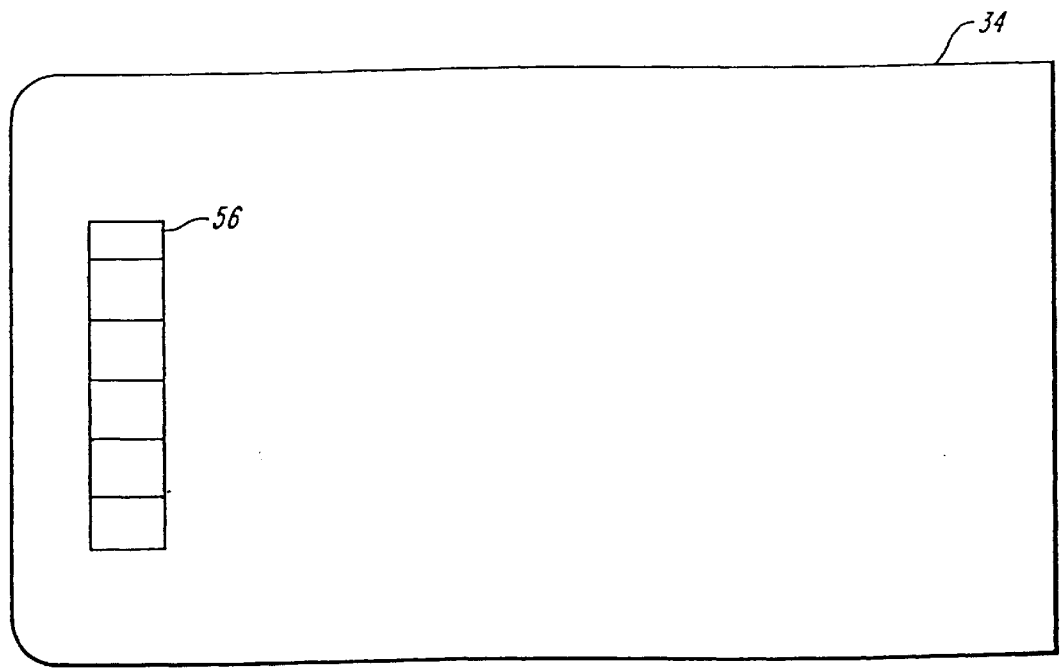
FIG. 4 depicts an interior wall of the sleeve depicted in FIG. 2 having a contact port that extends through the wall.

FIG. 4 depicts a partition wall 34 that includes a contact port 56 that couples the first partition of the card sleeve 28 to the second partition of the card sleeve 28. Further, the contact port 56 is disposed between the two partitions to allow the contact of the balance reader to couple with the terminal point of the electronic money card. As depicted in FIG. 4, this embodiment provides the contact port 56 at one end of the partition wall 34 to provide a port that extends between the wall 34 and which allows the circuit assembly 36 to electrically couple to a purse card 22 by allowing contact points on the circuit assembly 36 to electronically couple, i.e. contact, the lead terminals of the purse card 22. In this way, when the purse card 22 slid into the second partition of the card sleeve 28 and pressure is applied to the exterior of the card sleeve 28 to contact the contact terminals against the lead terminals, the circuit assembly 36 reads the balance of the card 22 and displays it in the display element 18 depicted in FIG. 1.

It will be apparent to one of ordinary skill in the art of electrical engineering, that any electrical interconnection suitable for electrically coupling the circuit assembly 36 with the purse card 22 can be practiced with the present invention without departing from the scope thereof, and that such an electrical connection can be formed upon sliding the purse card 22 within the second partition of the credit card sleeve 28 with sufficient pressure to form a mechanical contact between the terminal points and the leads.

In an alternative embodiment of the invention, the circuit assembly 36 depicted in FIG. 3 can be formed directly onto the material of the wallet sidewall 12 depicted in FIG. 1. In this embodiment, a conductive material can be placed upon the sidewall 12 to form a circuit pattern for the balance reader. Upon formation of the circuit pattern, circuit elements can be mounted to the sidewall 12 to form a circuit assembly thereon. The circuit assembly formed on the sidewall 12 of the wallet 10 can function as the circuit assembly 36 depicted in FIG. 3. In this practice of the invention, the conductive material can be formed on the sidewall 12 using a masking operation where a mask is provided over the sidewall and a process, and a lithographic process is employed to form the circuit pattern on the sidewall 12. Alternatively, the conductive material can be applied by applying a conductive paste to the sidewall to form a circuit pattern of the balance reader, or alternatively, can be formed by applying a conductive ink to the sidewall to form thereon a circuit pattern of the balance reader. Polymeric paste can also be employed to form the circuit pattern and hardened by UV light to form the actual circuit. Surface mount soldering can be employed at regular oven temperatures and leather will withstand these temperatures.

In this embodiment, the card sleeve 28 can slidably receive a purse card 22 into a partition that is adjacent to the sidewall 22. As described above, the contact port can couple the partition holding the purse card with the partition that includes the electronic balance reader, such that among sliding purse card 22 into the first partition. The leads of the purse card 22 couple to the terminal points of the balance reader. A display element can be disposed on the sidewall 12 to provide to the user a display of the balance of purse card 22. In one embodiment, the display is positioned above the card sleeve 28 such that the display is disposed of location which would not be obstructed by placing the purse card 22 over the circuitry of the balance reader 36.

It will be understood to those of ordinary skill in the art of electrical engineering, the above invention can be modified or supplemented in order to provide alternative embodiments of a wallet that includes, integrated therein, a balance reader suitable for reading an electronic purse card. However, such modifications are not deemed to depart from the scope of the invention, and are considered in the skill of an ordinary electrical engineer. Accordingly, the invention is not to be limited by the above description of the illustrated embodiments, but is to be defined by the claims as follows.

What is claimed is:

1. A process for manufacturing a balance reader for an electronic money card, comprising the steps of providing a wallet having a first sidewall, and applying a conductive material to said sidewall to form a circuit pattern for said balance reader.

2. A process according to claim 1, further including mounting circuit elements to said sidewall to form a circuit assembly thereon.

3. A process according to claim 1, wherein applying conductive material includes providing a mask over said sidewall.

4. A process according to claim 1, wherein applying conductive material includes applying conductive paste to said sidewall.

5. A process according to claim 1, wherein applying conductive material includes applying conductive ink to said sidewall.

* * * * *